(12) United States Patent
Matsuda et al.

(10) Patent No.: US 11,091,016 B2
(45) Date of Patent: Aug. 17, 2021

(54) LOWER VEHICLE-BODY STRUCTURE OF VEHICLE

(71) Applicant: MAZDA MOTOR CORPORATION, Hiroshima (JP)

(72) Inventors: Yamato Matsuda, Hiroshima (JP); Nobuyuki Nakayama, Aki-gun (JP); Katsuhito Kouno, Hiroshima (JP); Toshihiro Takebayashi, Kure (JP); Toshiyuki Koga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 84 days.

(21) Appl. No.: 16/733,937

(22) Filed: Jan. 3, 2020

(65) Prior Publication Data
US 2020/0282816 A1 Sep. 10, 2020

(30) Foreign Application Priority Data

Mar. 6, 2019 (JP) .............................. JP2019-040169
Mar. 6, 2019 (JP) .............................. JP2019-040170

(51) Int. Cl.
| | |
|---|---|
| *B60J 7/00* | (2006.01) |
| *B60K 1/04* | (2019.01) |
| *B62D 25/02* | (2006.01) |
| *B62D 25/20* | (2006.01) |
| *H01M 10/0525* | (2010.01) |

(52) U.S. Cl.
CPC .............. *B60K 1/04* (2013.01); *B62D 25/025* (2013.01); *B62D 25/2036* (2013.01); *B60K 2001/0438* (2013.01); *H01M 10/0525* (2013.01)

(58) Field of Classification Search
CPC ....... Y02T 10/64; Y02T 10/72; Y02T 10/645; Y02T 10/70; B60L 2200/26; H01L 2924/00; H01L 2924/00014; H01L 2224/45144; H01L 2924/00015; H01L 2224/48463
See application file for complete search history.

(56) References Cited

U.S. PATENT DOCUMENTS

| | | | |
|---|---|---|---|
| 6,299,239 B1 * | 10/2001 | Sagawa ................ | B60N 2/4235 |
| | | | 296/187.12 |
| 10,654,357 B2 * | 5/2020 | Murashige ........... | B60K 15/067 |
| 10,723,391 B2 * | 7/2020 | Saeki ..................... | B60N 2/015 |

(Continued)

FOREIGN PATENT DOCUMENTS

| | | |
|---|---|---|
| JP | H07-081625 A | 3/1995 |
| JP | 2016-153269 A | 8/2016 |
| WO | 2012/063393 A1 | 5/2012 |

*Primary Examiner* — Kiran B Patel
(74) *Attorney, Agent, or Firm* — Studebaker & Brackett PC

(57) ABSTRACT

There are provided a pair of side sills, a floor panel, a pair of floor frames, a battery unit provided between the pair of floor frames, a first cross member interconnecting the pair of side sills, and a seat bracket. The seat bracket comprises a protrusion portion which partially covers an upper wall portion of the first side portion and is upwardly spaced apart from the upper wall portion of the first cross member, and the bead portions and the opening portion (low-rigidity portion) are formed at a part of the upper wall portion of the first cross member which is located at a position corresponding to the protrusion portion.

15 Claims, 13 Drawing Sheets

(56) References Cited

U.S. PATENT DOCUMENTS

| | | | |
|---|---|---|---|
| 2004/0099465 A1* | 5/2004 | Matsumoto | B62D 25/2036 180/309 |
| 2005/0146186 A1* | 7/2005 | Kinnou | B60N 2/203 297/331 |
| 2013/0229030 A1 | 9/2013 | Yamaguchi et al. | |
| 2013/0320713 A1* | 12/2013 | Iwamoto | B62D 25/20 296/193.07 |
| 2016/0207572 A1* | 7/2016 | Natsume | B62D 25/20 |
| 2018/0304937 A1* | 10/2018 | Kita | B62D 25/2045 |
| 2019/0202286 A1* | 7/2019 | Natsume | B60K 17/00 |
| 2019/0217742 A1* | 7/2019 | Natsume | B60K 17/08 |
| 2019/0382054 A1* | 12/2019 | Natsume | B62D 25/025 |
| 2020/0070671 A1* | 3/2020 | Ohkuma | B60L 50/66 |
| 2020/0361534 A1* | 11/2020 | Matsuda | B62D 25/145 |
| 2020/0361535 A1* | 11/2020 | Matsuda | B62D 21/04 |
| 2020/0361541 A1* | 11/2020 | Matsuda | B62D 27/023 |
| 2020/0361542 A1* | 11/2020 | Matsuda | B62D 25/2036 |
| 2020/0385059 A1* | 12/2020 | Kubota | B62D 21/152 |

\* cited by examiner

LOWER VEHICLE-BODY STRUCTURE OF VEHICLE

BACKGROUND OF THE INVENTION

The present invention relates to a lower vehicle-body structure of a vehicle, and in particular, relates to the lower vehicle-body structure of the vehicle which comprises a battery unit provided between a pair of floor frames and a seat bracket provided at an outward-side end portion, in a vehicle width direction, of a cross member which interconnects a pair of side sills in a vehicle width direction.

Conventionally, in an electric vehicle, such as a hybrid vehicle or an electric automotive vehicle, a battery unit is provided by using a space below a vehicle-body floor because a battery as a power source of an electric motor to drive vehicle wheels (e.g., a motor generator or a motor) has a large (high) capacity. In general, the battery unit comprises a plurality of battery modules which are composed of a battery-cell assembly, such as lithium-ion battery cells, an upper cover and a lower cover which store (accommodate) these plural battery modules, a support member which supports these covers at a vehicle body, and so on.

A floor structure of an automotive vehicle disclosed in WO2012/063393 (US Patent Application Publication No. 2013/0229030 A1) comprises a pair of right-and-left side sills extending in a vehicle longitudinal direction, a floor panel provided to extend between the pair of side sills, a pair of right-and-left floor frames extending in the vehicle longitudinal direction between the pair of side sills on a downward side of the floor panel, a battery unit provided between the pair of floor frames, an upper cross member interconnecting the pair of side sills on an upward side of the floor panel, and a lower cross member interconnecting the pair of side sills on a downward side of the floor panel at a position located below the upper cross member, wherein the battery unit is interposed between the upper cross member and the lower cross member. Herein, the upper cross member is configured such that a part thereof which extends between the side sill and the floor frame has a thinner plate thickness than another part thereof which extends on an inward side, in the vehicle width direction, of the floor frame in order to suppress deformation of the floor frames in a vehicle side collision.

Further, the technologies to improve the energy absorption (EA) performance of the cross member in a case of the vehicle side collision structurally, not by a material itself, such as the plate thickness or the quality of a material, have been proposed. A vehicle-body floor structure disclosed in Japanese Patent Laid-Open Publication No. H7-81625 comprises a cross member interconnecting a pair of side sills on the upward side of a floor panel and a battery unit provided between a pair of floor frame on the downward side of the floor panel, wherein bead portions which respectively extend in a longitudinal direction are formed at respective sections of an upper face portion of the cross member which are located at respective positions corresponding to a cross point of the cross member and the floor frame and a point positioned on the outward side, in the vehicle width direction, of this cross point.

The cross member interconnecting the pair of side sills forms a closed-cross section extending in the vehicle width direction together with an upper surface of the floor panel, which is one of major rigidity members which constitute a framework (skeleton) of the vehicle body. Therefore, seat brackets to support a seat capable of seating a passenger are provided at an outward-side (side-sill side) end portion, in the vehicle width direction, of the cross member which is a rigidity member and an inward-side (tunnel side) end portion, in the vehicle width direction, of the cross member.

The seat bracket is required to have the passenger-supporting rigidity which is so high in the vertical direction that an appropriate driving position can be secured regardless of a vehicle-traveling condition. That is, even if the structure in which a low-rigidity portion, the bead portions or the like are provided at the cross member is adopted as shown in the above-described patent documents, in a case where the high-rigidity seat bracket is provided at a part of the cross member which is interposed between the side sill and the floor frame, an increase of the rigidity of the part of the cross member provided with the seat bracket may improperly hinder the smooth collapse deformation of the cross member, so that there is a concern that the expected EA (energy absorption) performance may not be secured.

Herein, Japanese Patent Laid-Open Publication No. 2016-153269, which is irrelevant to the technology of improving the above-described EA performance of the cross member in the vehicle side collision, discloses a vehicle-body structure of an automotive vehicle in which at a front end portion of a side sill inner is provided a front-side reinforcement which extends from an upper wall portion to an inward end portion, whereby a front wheel is preventing from coming into a cabin in a small-overlap vehicle collision.

SUMMARY OF THE INVENTION

Accordingly, an object of the present invention is to provide a low vehicle-body structure of a vehicle which can compatibly secure the support rigidity of the seat bracket and the energy absorption (EA) performance of the cross member.

The present invention is a lower vehicle-body structure of a vehicle, comprising a pair of right-and-left side sills extending in a vehicle longitudinal direction, a floor panel provided to extend between the pair of side sills, a pair of right-and-left floor frames extending in the vehicle longitudinal direction between the pair of side sills on a downward side of the floor panel, a battery unit provided between the pair of floor frames, a first cross member interconnecting the pair of side sills on an upward side of the floor panel, and a seat bracket supporting a seat capable of seating a passenger and provided at an outward end portion, in a vehicle width direction, of the first cross member, wherein the seat bracket comprises a protrusion portion which partially covers an upper face portion of the first cross member and is upwardly spaced apart from the upper face portion of the first cross member, and a low-rigidity portion is formed at a part of the upper face portion of the first cross member which is located at a position corresponding to the protrusion portion of the seat bracket, the low-rigidity portion being configured to make rigidity of the part of the upper face portion of the first cross member where the low-rigidity portion is formed be lower than that of the other part of the upper face of the cross member where the low-rigidity portion is not formed.

According to the present invention, since the seat bracket comprises the protrusion portion which partially covers the upper face portion of the first cross member and is upwardly spaced apart from the upper face portion of the first cross member, the first cross member is provided with the part of the upper face portion thereof which is spaced apart from the seat bracket and also the seat bracket can be disposed at the first cross member. Further, since the low-rigidity portion is formed at the part of the upper face portion of the first cross member which is located at the position corresponding to the protrusion portion of the seat bracket and this low-rigidity portion is configured to make rigidity of the part of the upper face portion of the first cross member where the low-rigidity portion is formed be lower than that of the other part of the upper face of the cross member where the low-rigidity portion is not formed, the above-described part of the upper face portion of the first cross member can be properly collapsed and deformed inwardly, in the vehicle width direction, by a load inputted in the vehicle side collision, without improperly decreasing the rigidity of a vertical wall portion (the front wall portion and the rear wall portion) of the first cross member which contributes to the support rigidity of the seat bracket.

In an embodiment of the present invention, the low-rigidity portion is one or plural bead portions which are configured to extend in the vehicle longitudinal direction at the part of the upper face portion of the first cross member.

According to this embodiment, the above-described part of the upper face portion of the first cross member can be properly collapsed and deformed inwardly, in the vehicle width direction, with a simple structure.

In another embodiment of the present invention, the low-rigidity portion is an opening portion which is formed at the part of the upper face portion of the first cross member.

According to this embodiment, the above-described part of the upper face portion of the first cross member can be properly collapsed and deformed inwardly, in the vehicle width direction, achieving weight reduction.

In another embodiment of the present invention, the low-rigidity portion is composed by an opening portion and a bead portion which are formed at the part of the upper face portion of the first cross member such that the bead portion extends in the vehicle longitudinal direction, overlapping the opening portion in the vehicle width direction.

According to this embodiment, the energy absorption (EA) performance in the case of the vehicle side collision can be further improved.

In another embodiment of the present invention, the seat bracket further comprises a front wall portion, a rear wall portion which faces the front wall portion, and an upper wall portion which connects respective upper ends of the front wall portion and the rear wall portion, and a bead portion which extends in a vertical direction is formed at each of the front wall portion and the rear wall portion.

According to this embodiment, the seat bracket can be bent and deformed inwardly in the vehicle width direction, without reducing the rigidity, in the vertical direction, of the front wall portion and the rear wall portion of the seat bracket, and the first cross member can be allowed to have inwardly-generated collapse deformation which is caused by the load inputted in the vehicle side collision.

In another embodiment of the present invention, an opening portion is formed at a portion of the upper face portion of the first cross member which is enclosed by the bead portions formed at the front wall portion and the rear wall portion.

According to this embodiment, the bending deformation of the seat bracket which is caused by the bead portion and the collapse deformation of the first cross member which is caused by the opening portion can be synchronized, so that the collapse deformation of the first cross member can be promoted.

In another embodiment of the present invention, each of the front wall portion and the rear wall portion of the seat bracket is joined to the first cross member at portions thereof which interpose the bead portion between the portions.

According to this embodiment, the seat bracket can be joined to the first cross member, without hindering the bending deformation of the seat bracket.

In another embodiment of the present invention, the lower vehicle-body structure further comprises a second cross member interconnecting the pair of side sills at a foot space of a passenger seated in a rear seat which is positioned on a rearward side, in the vehicle longitudinal direction, of the first cross member, wherein the first cross member forms a first closed-cross section extending in a vehicle width direction together with the floor panel, the second cross member forms a second closed-cross section extending in the vehicle width direction together with the floor panel, the second closed-cross section is set to have a lower sectional height and a smaller sectional area than the first closed-cross section, and a position of an inward end of a low-rigidity portion which is formed at the second cross member is located on an inward side, in the vehicle width direction, of a position of an inward end of a low-rigidity portion which is formed at the first cross member.

According to this embodiment, the foot space of the passenger seated in the rear seat can be secured properly by lowering the sectional height of the second cross member and also deterioration of the energy absorption performance in the case of the vehicle side collision can be suppressed by decreasing the sectional area of the second cross member and thereby positioning the inward end of the low-rigidity portion at the inward side in the vehicle width direction.

In another embodiment of the present invention, each of the pair of floor frames extends obliquely such that a rearward side thereof is located on an outward side, in the vehicle width direction, of a forward side thereof, the position of the inward end of the low-rigidity portion formed at the first cross member is located at the same position, in the vehicle width direction, as the floor frame, and the position of the inward end of the low-rigidity portion formed at the second cross member is located on the inward side, in the vehicle width direction, of the floor frame.

According to this embodiment, the deterioration of the energy absorption performance in the case of the vehicle side collision which may be caused by setting the second cross member to have the smaller sectional area than the first cross member can be properly suppressed by collapsing of the floor frame in addition to collapsing of the low-rigidity portion.

In another embodiment of the present invention, the lower vehicle-body structure further comprises a second cross member interconnecting the pair of side sills at a position which is located on an upward side of the battery unit via the floor panel and on a rearward side of the first cross member, wherein a reinforcing member which extends substantially horizontally is provided inside each of the pair of side sills, and the reinforcing member is provided to extend at least from the first cross member to the second cross member.

According to this embodiment, since the reinforcing member extending substantially horizontally is provided inside each of the pair of side sills, the rigidity, in the vehicle width direction, of the side sill can be effectively increased by the reinforcing member. Further, since the reinforcing member is provided to extend at least from the first cross member to the second cross member, a load path reaching the first and second cross members can be created via the reinforcing member regardless of an input position of a collision load in the vehicle side collision, so that the load applied in the vehicle side collision can be dispersed by utilizing the framework structure of the vehicle body.

In another embodiment of the present invention, each of the first and second cross members is configured such that an outward-side portion thereof which is positioned on an outward side, in the vehicle width direction, of the floor frame has lower rigidity than an inward-side portion thereof which is positioned on an inward side, in the vehicle width direction, of the floor frame.

According to this embodiment, the respective outward-side portions of the first and second cross members which are positioned on the outward side, in the vehicle width direction, of the floor frame can be made to have the inwardly-generated collapse deformation, so that the energy absorption performance in the case of the vehicle side collision can be improved.

In another embodiment of the present invention, each of the pair of side sills comprises a side sill outer which forms an outward-side portion, in the vehicle width direction, thereof and a side sill inner which forms an inward-side portion, in the vehicle width direction, thereof, and the reinforcing member is provided to extend from an inward end, in the vehicle width direction, of the side sill inner to an outward end, in the vehicle width direction, of the side sill inner.

According to this embodiment, the load applied in the vehicle side collision can be dispersed, preventing buckling of the side sill.

In another embodiment of the present invention, the side sill inner comprises an upper wall portion, a lower wall portion which faces the upper wall portion, and an inward-side wall portion which connects respective inward-side ends, in the vehicle width direction, of the upper wall portion and the lower wall portion, and the reinforcing member is provided to extend from the upper wall portion to the inward-side wall portion.

According to this embodiment, the load applied in the vehicle side collision can be dispersed, preventing sectional collapsing of the side sill.

In another embodiment of the present invention, the reinforcing member is provided to extend from a front end of the side sill inner to a rear end of the side sill inner.

According to this embodiment, the load path reaching the first and second cross members can be created even when the input position of the collision load is far away from the first and second cross members.

In another embodiment of the present invention, the lower vehicle-body structure further comprises a stopper bracket which is provided to connect an upper wall portion of side sill inner and a flange portion of the side sill inner so as to suppress a side door of the vehicle from coming into a cabin in a vehicle side collision, wherein each of the pair of floor frames extends obliquely such that a rearward side thereof is located on the outward side, in the vehicle width direction, of a forward side thereof, a position of an inward end of a low-rigidity portion which is formed at the first cross member is located at the same position, in the vehicle width direction, as the floor frame, and a position of an inward end of a low-rigidity portion which is formed at the second cross member is located on the inward side, in the vehicle width direction, of the floor frame.

According to this embodiment, the side door can be properly suppressed from coming into the cabin in the vehicle side collision by the stopper bracket and also deterioration of the energy absorption performance of the side sill which may be caused by providing the stopper bracket can be properly suppressed by both collapsing of the low-rigidity portion and the floor frame.

The present invention will become apparent from the following description which refers to the accompanying drawings.

DETAILED DESCRIPTION OF THE INVENTION

Figure 1:
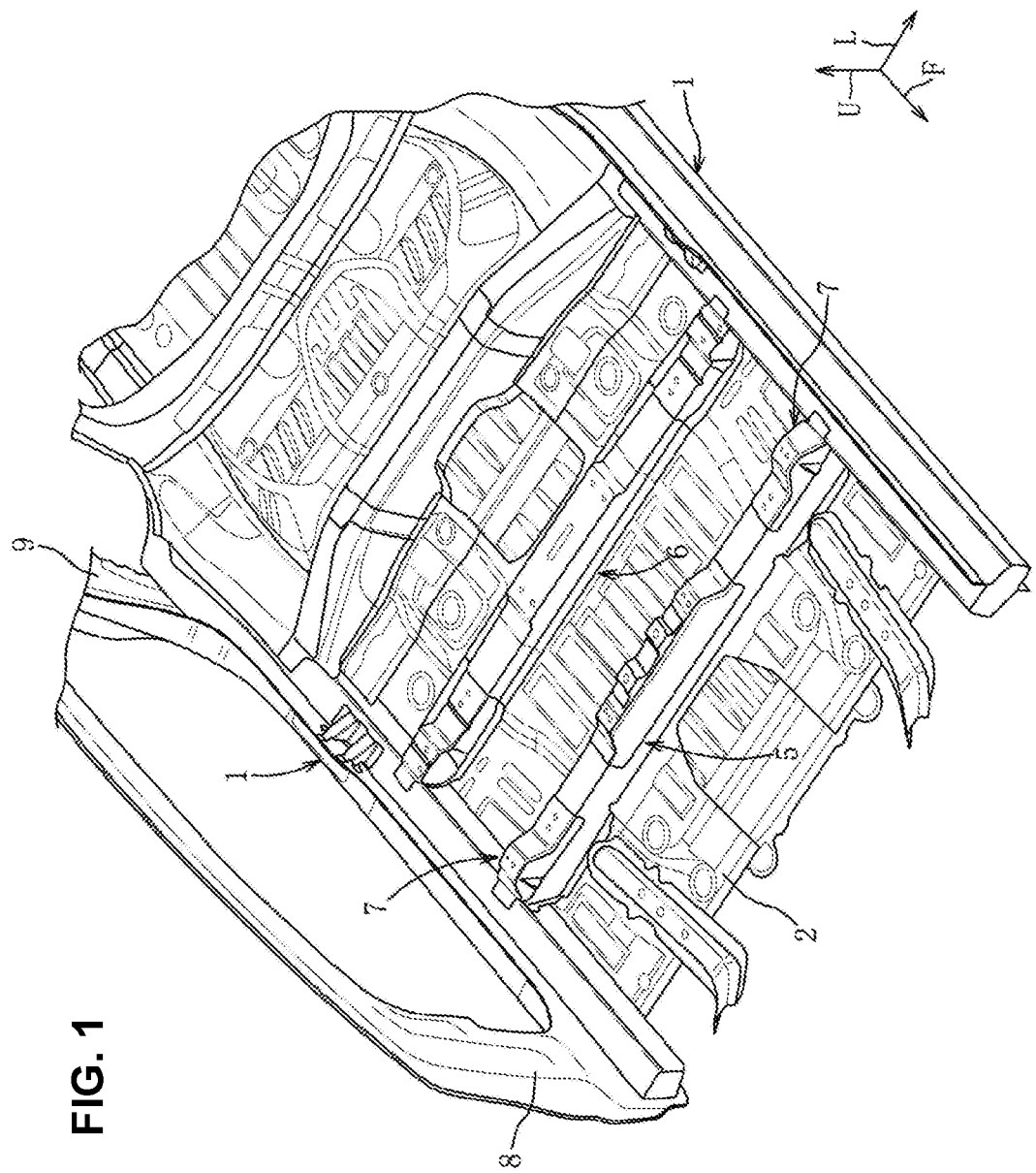
FIG. 1 is a perspective view of an upper part of a lower vehicle body of a vehicle according to an embodiment of the present invention.
Figure 2:
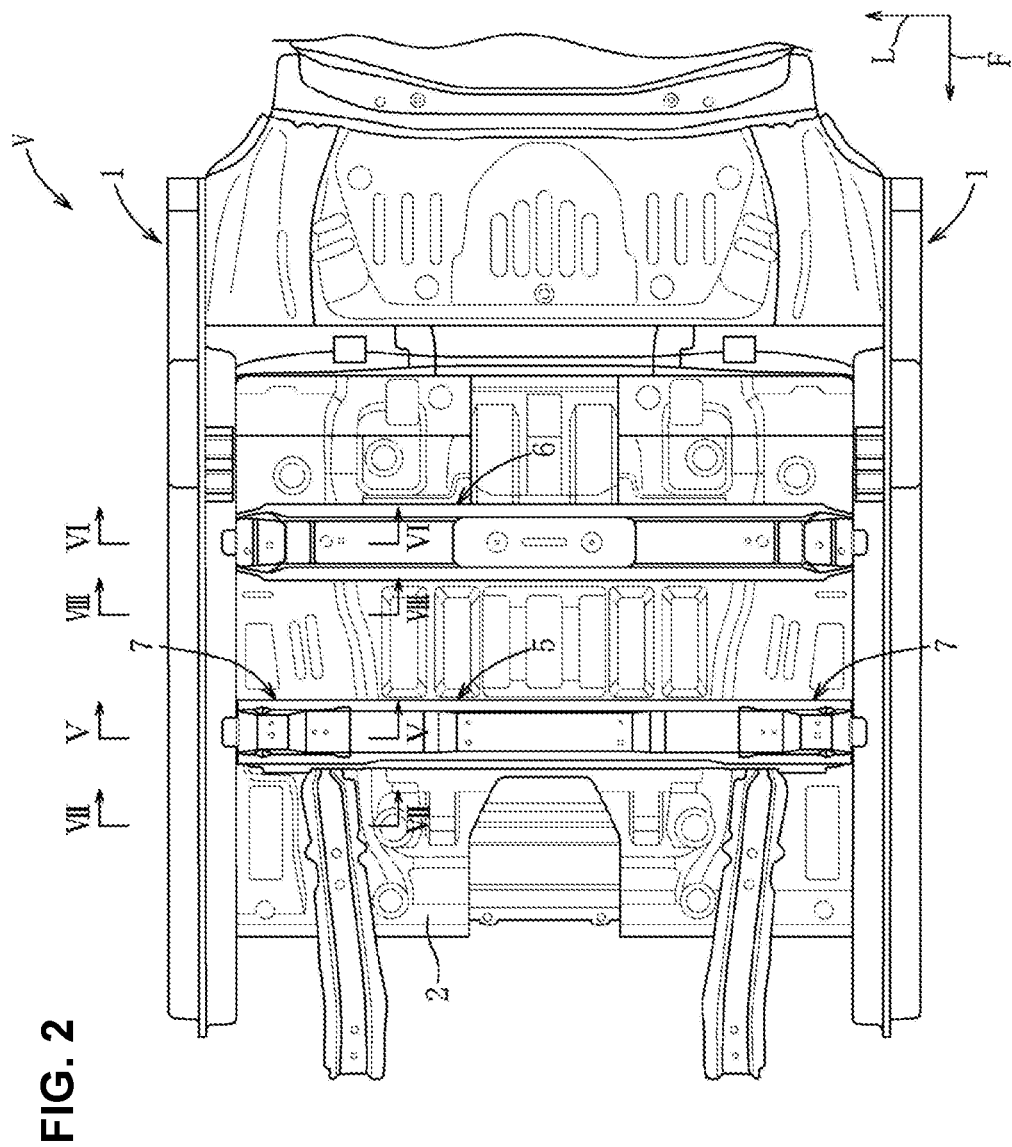
FIG. 2 is a plan view.

Hereafter, an embodiment of the present invention will be described referring to the drawings. The following description regarding the embodiment relates to merely an exemplified invention and should not limit the present invention and its application or use.

The present embodiment will be specifically described referring to FIGS. 1 through 13. A vehicle V according to the present embodiment is a hybrid automotive vehicle which combines an internal combustion engine (not illustrated), such as a gasoline or diesel engine, and an electric motor (motor generator) for driving the vehicle as a drive (power) source.

As shown in FIGS. 1 through 4, the vehicle V comprises a pair of right-and-left side sills 1, a floor panel 2, a pair of right-and-left floor frames 3, a battery unit 4, first and second cross members 5, 6, and others. Further, the vehicle V comprises a pair of seat brackets 7 for supporting a pair of front seats which are provided at right-and-left both end portions of a first cross member 5. In the figures, a direction shown by an arrow F means a forward (front) side, in a longitudinal direction, of the vehicle, a direction shown by an arrow L means a leftward (left) side, in a width direction, of the vehicle, and a direction shown by an arrow U means an upward (upper) side, in a vertical direction, of the vehicle. Further, the vehicle V is configured to be laterally symmetrical, and therefore the followings describe a right-side member or part of the vehicle primarily unless there are special explanations.

The pair of side sills 1 will be described first. The right-side side sill 1 comprises an outer panel 11 which constitutes a right-side wall portion and an inner panel 12 which constitutes a left-side wall portion, and these panels 11, 12 jointly form a nearly rectangular-shaped closed-cross section extending longitudinally. A hinge pillar 8 extending vertically is connected to a front-end-side portion of the side sill 1, and a rear pillar 9 extending vertically is connected to a rear-end-side portion of the side sill 1. Herein, this vehicle V is provided with a door structure of a so-called hinged double doors type in which a front door is opened/closed around a hinge provided at a front-end portion of the vehicle, a rear door is opened/closed around another hinge provided at a rear-end portion of the vehicle, and no center pillar is provided between the front door and the rear door.

As shown in FIGS. 5 through 8, the outer panel 11 comprises an outward-side wall portion 11a which is provided to be perpendicular to the vehicle width direction, an upper wall portion 11b which extends in a leftward direction from an upper end portion of the outward-side wall portion 11a, a lower wall portion 11c which extends in the leftward direction from a lower end portion of the outward-side wall portion 11a, an upper flange portion 11d which extends upwardly from a leftward end portion of the upper wall portion 11b, and a lower flange portion 11e which extends downwardly from a leftward end portion of the lower end portion 11c. The outer panel 11 is configured to have a nearly hat-shaped cross section.

At the outer panel 11 are provided an outer plate member 13 which is arranged on a rightward side of the outer panel 11 and an outer reinforcement 14 which is arranged on a leftward side of the outer panel 11. As shown in FIGS. 5 through 8 and 13, the outer plate member 13 is configured to cover the upper flange portion 11d, the upper wall portion 11b, and an upward-side portion of the outward-side wall portion 11a from a rightward side (outward side). Accordingly, the outer plate member 13 forms a closed-cross section extending from a front end of the outer panel 11 to a rear end of the outer panel 11 together with the outer panel 11. The outer reinforcement 14 is arranged on the rightward side, in the vehicle width direction, of a second cross member 6 in a plan view and have a nearly U-shaped lateral cross section. The outer reinforcement 14 is connected such that its upper end portion and its lower end portion are respectively connected to the upper flange portion 11d and the lower flange portion 11e, and a front end portion and a lower end portion of its middle-stage portion are connected to the outward-side wall portion 11a. Accordingly, each support rigidity of a front-door rear end portion and a rear-door front end portion is increased, so that the rigidity, in the vertical direction, of a vehicle-body middle part is secured in cooperation with the front door and the rear door.

As shown in FIGS. 5 through 8, the inner panel 12 comprises an inward-side wall portion 12a which is provided to be perpendicular to the vehicle width direction, an upper wall portion 12b which extends in a rightward direction from an upper end portion of the inward-side wall portion 12a, a lower wall portion 12c which extends in the rightward direction from a lower end portion of the inward-side wall portion 12a, an upper flange portion 12d which extends upwardly from a rightward end portion of the upper wall portion 12b, and a lower flange portion 12e which extends downwardly from a rightward end portion of the lower end portion 12c. The inner panel 12 is configured to have a nearly hat-shaped cross section. The upper flange portion 12d and the lower flange portion 12e are respectively joined to the upper flange portion 11d and the lower flange portion 11e by spot welding.

At the inner panel 12 are provided a first inner reinforcement 15 (reinforcing member) which is arranged on the rightward side of the inner panel 12 and plural second inner reinforcements 16. The first inner reinforcement 15 is made of a ultrahigh tensile strength steel plate having the plate thickness of 2.0 mm, for example, and configured to have a nearly L-shaped cross section. As shown in FIGS. 4 through 8, the first inner reinforcement 15 is provided to extend, in the lateral direction, from a left end (an inward end, in the vehicle width direction) of the inner panel 12 to a right end (an outward end, in the vehicle width direction) of the inner panel 12, and extend, in the longitudinal direction, from a front end of the inner panel 12 to a rear end of the inner panel 12. This first inner reinforcement 15 comprises an upward-side reinforcement portion 15a which extends substantially horizontally and an inward-side reinforcement portion 15b which extends substantially vertically. The upward-side reinforcement portion 15a overlaps a roughly-whole area of the upper wall portion 12b in a close-contact state, and the inward-side reinforcement portion 15b partially overlaps an upward-side portion of the inward-side wall portion 12a in the close-contact state.

As shown in FIGS. 4, 7, 8 and 13, the plural (e.g., four) second inner reinforcements 16 are respectively provided to be perpendicular to the longitudinal direction. The second inner reinforcements 16 are respectively joined to the inward-side wall portion 12a, the upper wall portion 12b, and the lower wall portion 12c, whereby at an inward side, in the vehicle width direction, of the closed-cross section of the side sill 1 are formed four gusset portions which partially close the closed-cross section of the side sill 1. The foremost second inner reinforcement 16 in the plan view is positioned such that it overlaps the hinge pillar 8 in the lateral direction, and the next second inner reinforcement 16 which is provided on a rearward side of the above-described foremost second inner reinforcement 16 is positioned slightly on a forward side of the first cross member 5. The other two second inner reinforcements 16 are positioned such that the second cross member 6 is interposed therebetween in the longitudinal direction, the forward-side one of which is positioned such that it overlaps the outer reinforcement 14 in the lateral direction.

Next, the floor panel 2 and the pair of floor frames 3 will be described. The floor panel 2 is provided to extend between the pair of side sills 1. Right-and-left both end portions of the floor panel 2 are respectively joined to the inward-side wall portions 12a of the pair of side sills 1, whereby a floor surface of a cabin of the vehicle V is constituted. A rear floor panel which forms a kick-up portion which extends obliquely rearwardly-and-upwardly is continuous from a rear end portion of the floor panel 2.

As shown in FIGS. 3 through 8, the pair floor frames 3 are configured to have a nearly hat-shaped cross section, respectively, and such that a distance therebetween becomes larger as it goes to the rearward side. Accordingly, a distance between the side sill 1 and the floor frame 3 becomes smaller as it goes to the rearward side. The floor frame 3 forms a rectangular-shaped closed-cross section extending in the longitudinal direction together with a lower surface of the floor panel 2.

Figure 3:
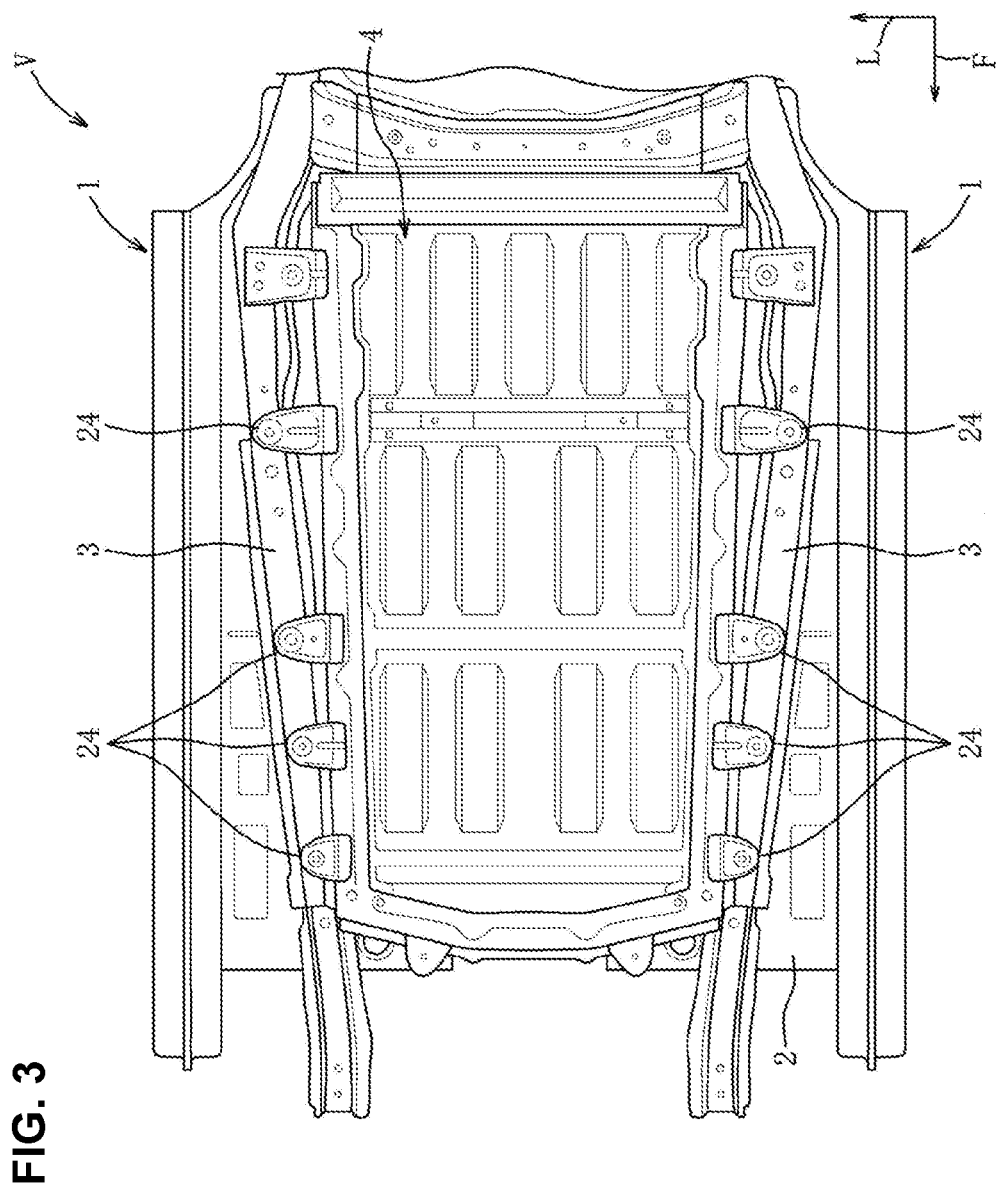
FIG. 3 is a back view.
Figure 4:
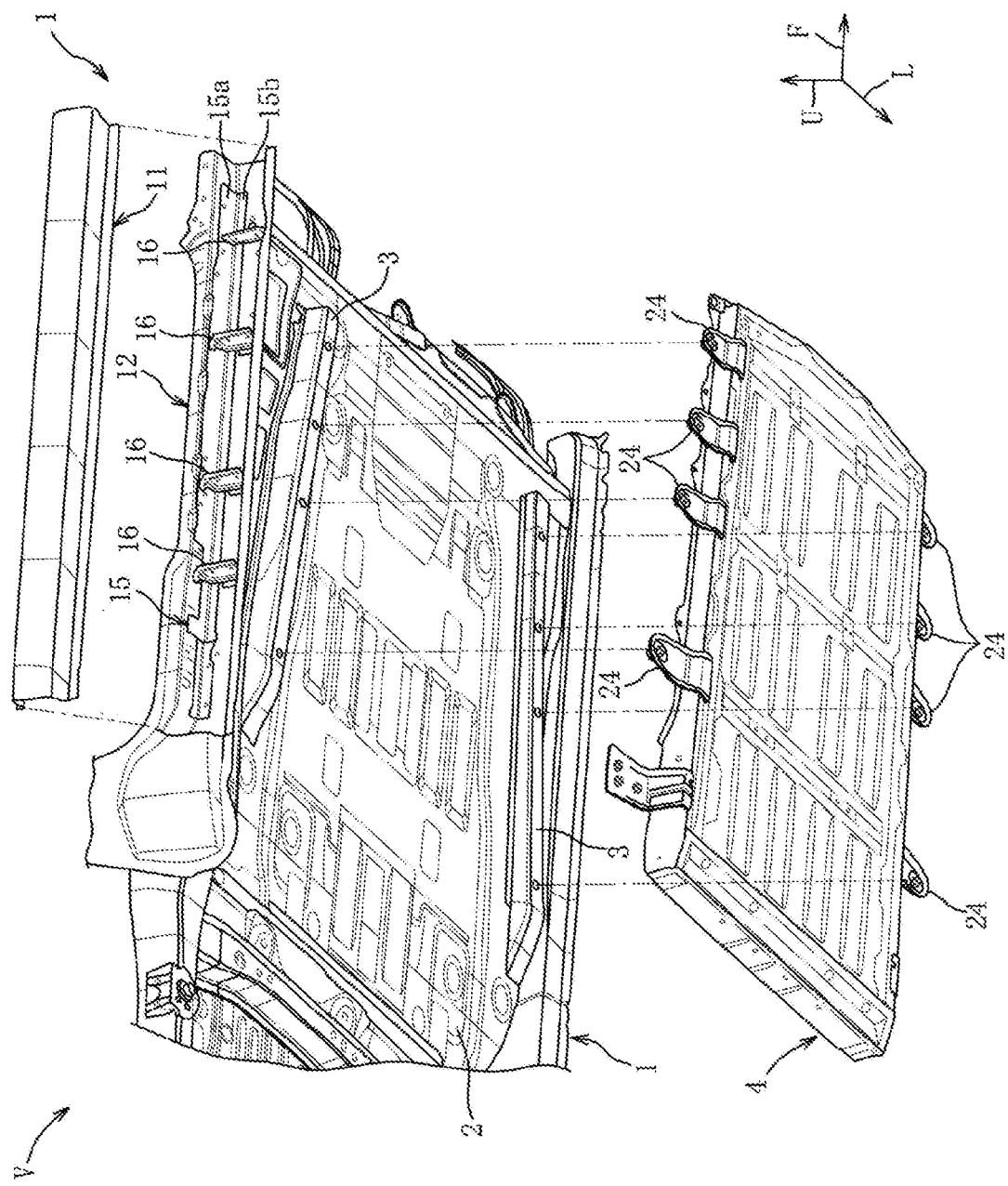
FIG. 4 is a partially-exploded perspective view.

Hereafter, the battery unit 4 will be described. As shown in FIGS. 3 and 4, the battery unit 4 is arranged in a space below the floor panel 2 in a state where a high-voltage battery connecting plural battery modules in series is stored. Accordingly, the battery unit 4 is configured to have the vibration resistance and the water resistance. The battery modules to supply the electric power to the electric motor for driving the vehicle are a rectangular-parallelepiped-shaped battery assembly where plural rectangular-parallelepiped-shaped battery cells to generate a standard voltage are arranged in a laminated state. The battery cell is a lithium ion battery which is a kind of secondary battery, for example.

The battery unit 4 primarily comprises a battery frame 21, a bottom plate 22, an upper cover 23, and plural support members 24.

Figure 5:
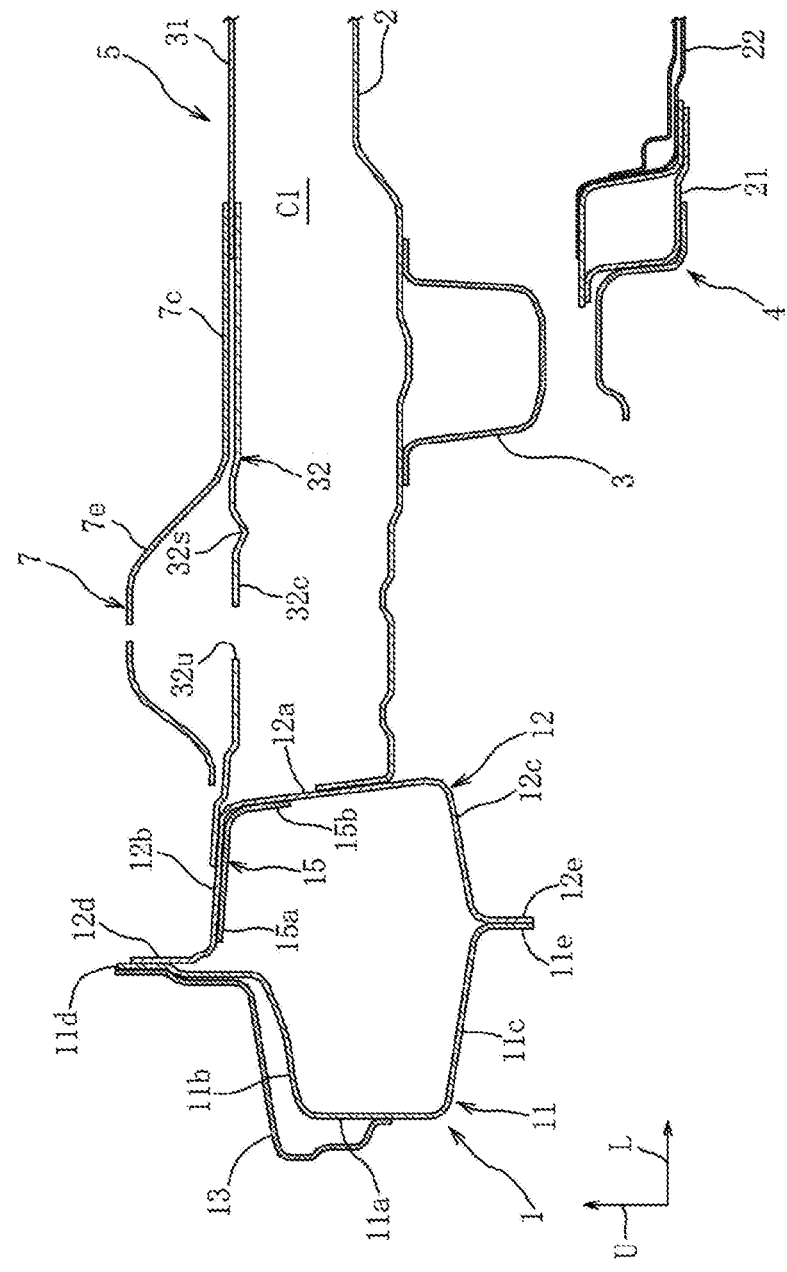
FIG. 5 is a sectional view taken along line V-V of FIG. 2.
Figure 6:
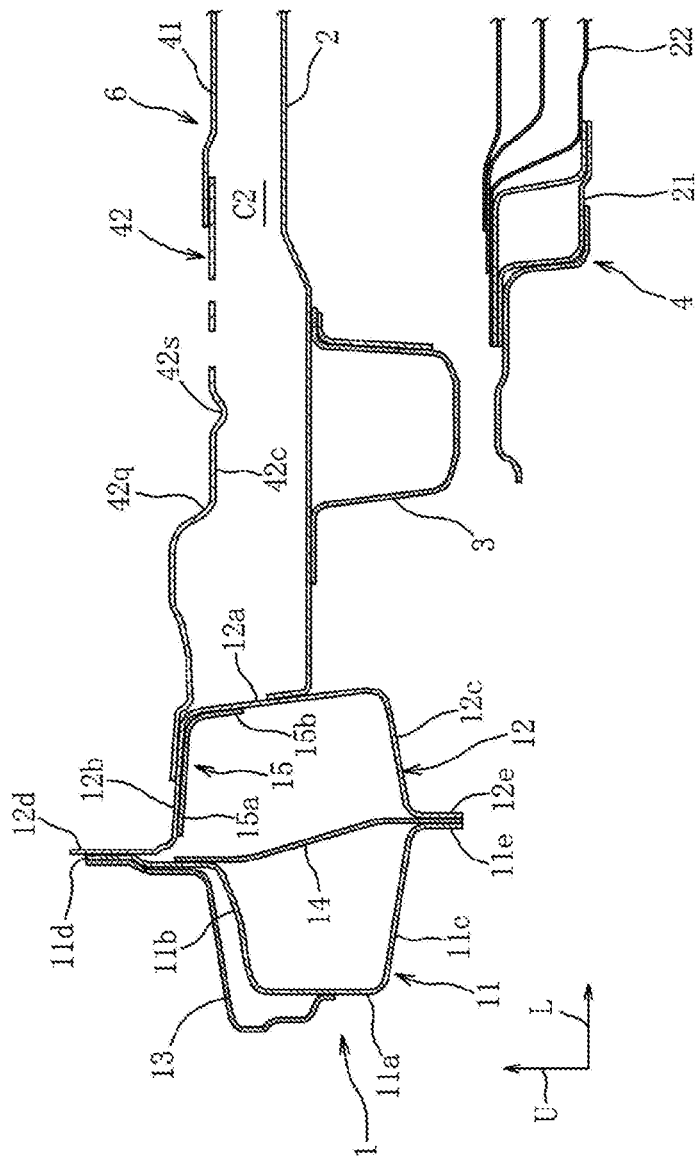
FIG. 6 is a sectional view taken along line VI-VI of FIG. 2.

The battery frame 21 is configured to have a nearly square-shaped closed-cross-section structural body which is formed by a crank-shaped upper frame and a crank-shaped lower frame (see FIGS. 5 and 6). The bottom plate 22 is made of metal excellent in thermal conductivity, such as aluminum alloy. An edge portion of the bottom plate 22 is supported at an upper wall portion and a flange portion of the battery frame 21. The battery frame 21 and the bottom plate 22 correspond to a lower cover of the battery unit 4. The upper cover 23 is fixed to an inner edge of the upper wall portion of the battery frame 21 via a seal gasket (not illustrated) in the close-contact state. The four support members 24 protrude outwardly, in the vehicle width direction, from left-and-right side portions of the battery frame 21. These support members 24 are fixedly fastened to respective lower wall portions of the pair of floor frames 3 by means of fastening members. Thus, the battery unit 4 is arranged below the floor panel 2 and between the pair of floor frames 3.

Subsequently, the first cross member 5 will be described. As shown in FIGS. 1, 2, 5, 7, 9 through 11 and 13, the first cross member 5 interconnects respective front-side parts of the pair of side sills 1 and forms a rectangular-shaped first closed-cross section C1 extending laterally together with the upper surface of the floor panel 2. The first cross member 5 comprises a first middle portion 31 and a pair of right-and-left first side portions 32 which extend outwardly, in the vehicle width direction, from right-and-left both end portions of the first middle portion 31. The first middle portion 31 is made of a ultrahigh tensile strength steel plate having the plate thickness of 1.8 mm, for example, and configured to have a nearly hat-shaped cross section. A flange portion formed at a lower end portion of the first middle portion 31 is joined to the upper surface of the floor panel 2 by welding.

The pair of first side portions 32 are respectively made of a steel plate having lower toughness and rigidity than the first middle portion 31, such as a cold rolled steel plate having the plate thickness of 1.0 mm, for example, and configured to have a nearly hat-shaped cross section. The right-side first side portion 32 comprises a front wall portion 32a which is provided to be perpendicular to the longitudinal direction, a rear wall portion 32b which faces the front wall portion 32a with a specified distance therebetween, an upper wall portion 32c which connects respective upper end portions of the front wall portion 32a and the rear wall portion 32b, and so on. Flange portions formed at respective lower end portions of the front wall portion 32a and the rear wall portion 32b are joined to the upper surface of the floor panel 2 by welding, and a flange portion formed at the right side (the outward side, in the vehicle width direction) thereof is joined to the inward-side wall portion 12a.

Figure 10:
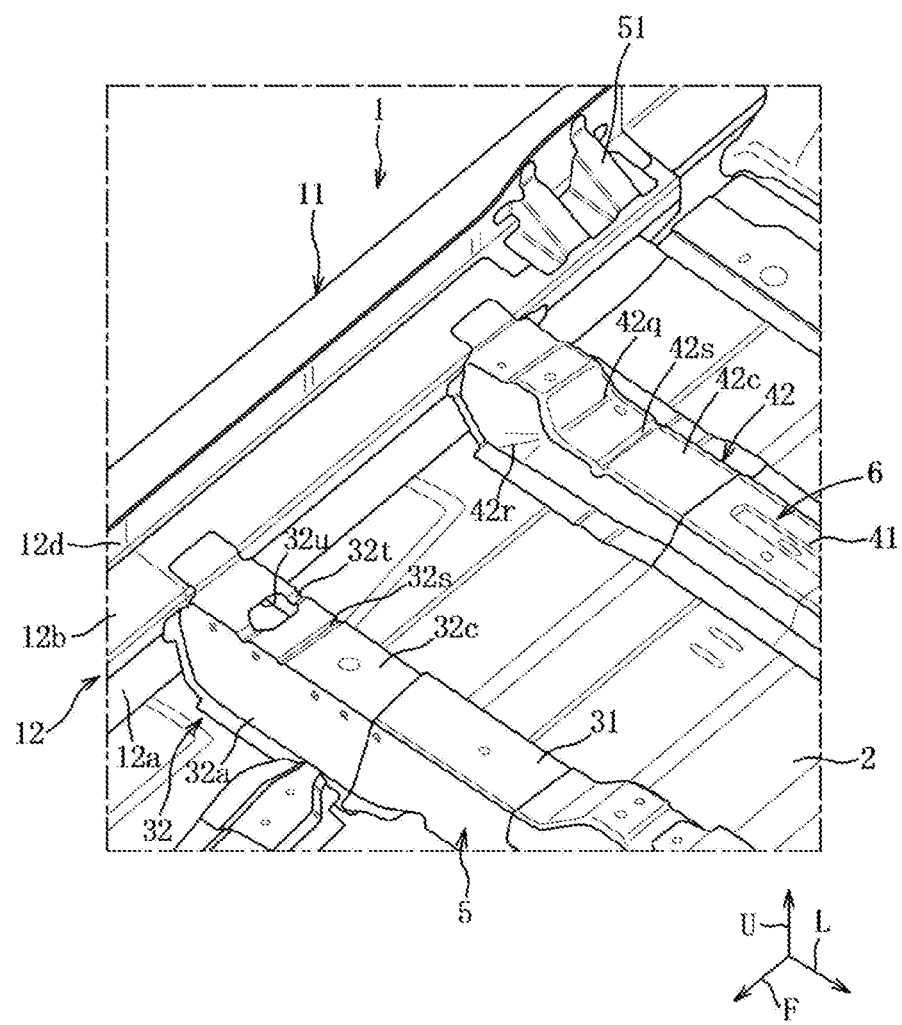
FIG. 10 is a perspective view in a state where illustration of a seat bracket is omitted from FIG. 5.
Figure 11:
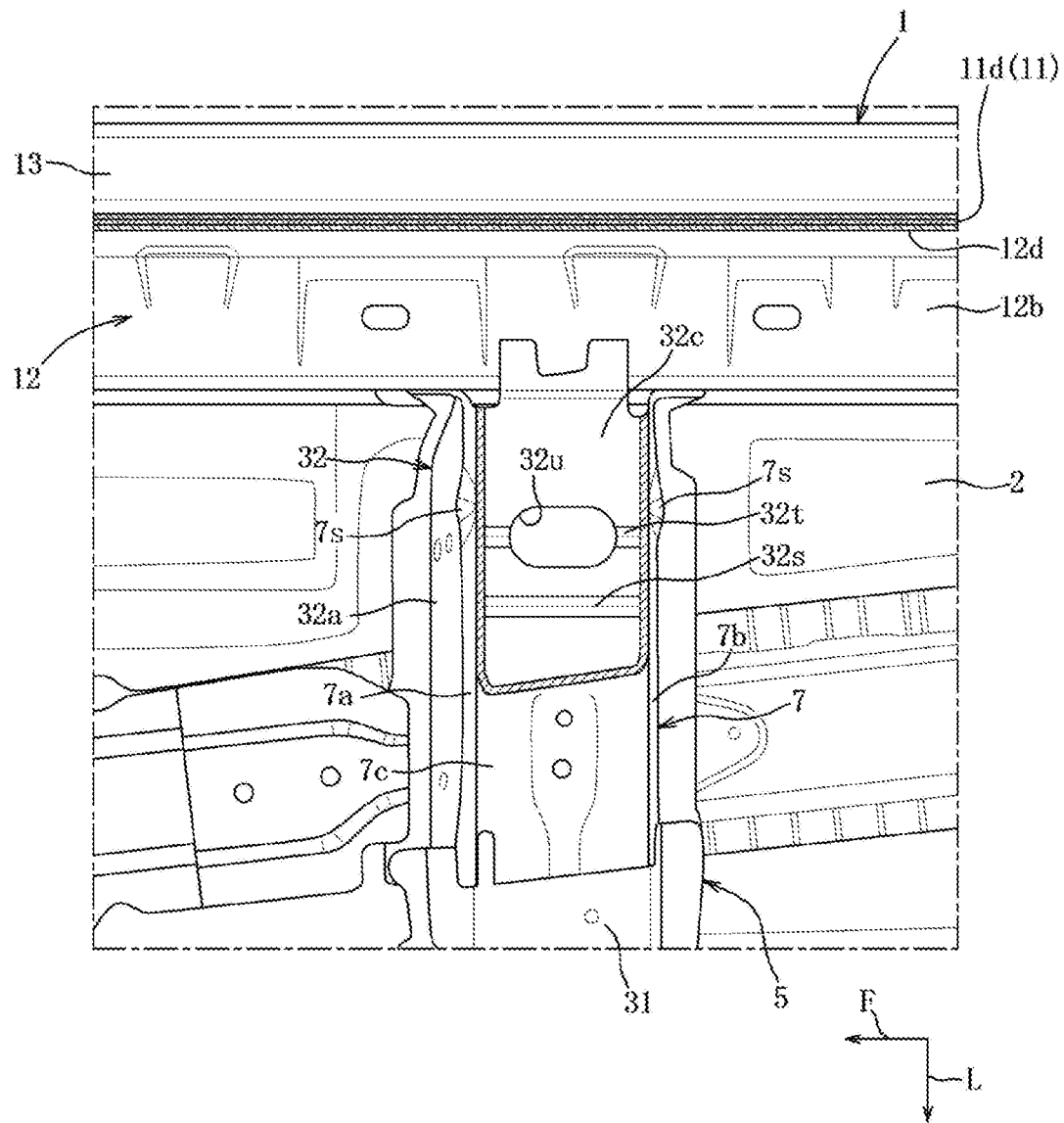
FIG. 11 is a sectional view taken along line XI-XI of FIG. 7.
Figure 12:
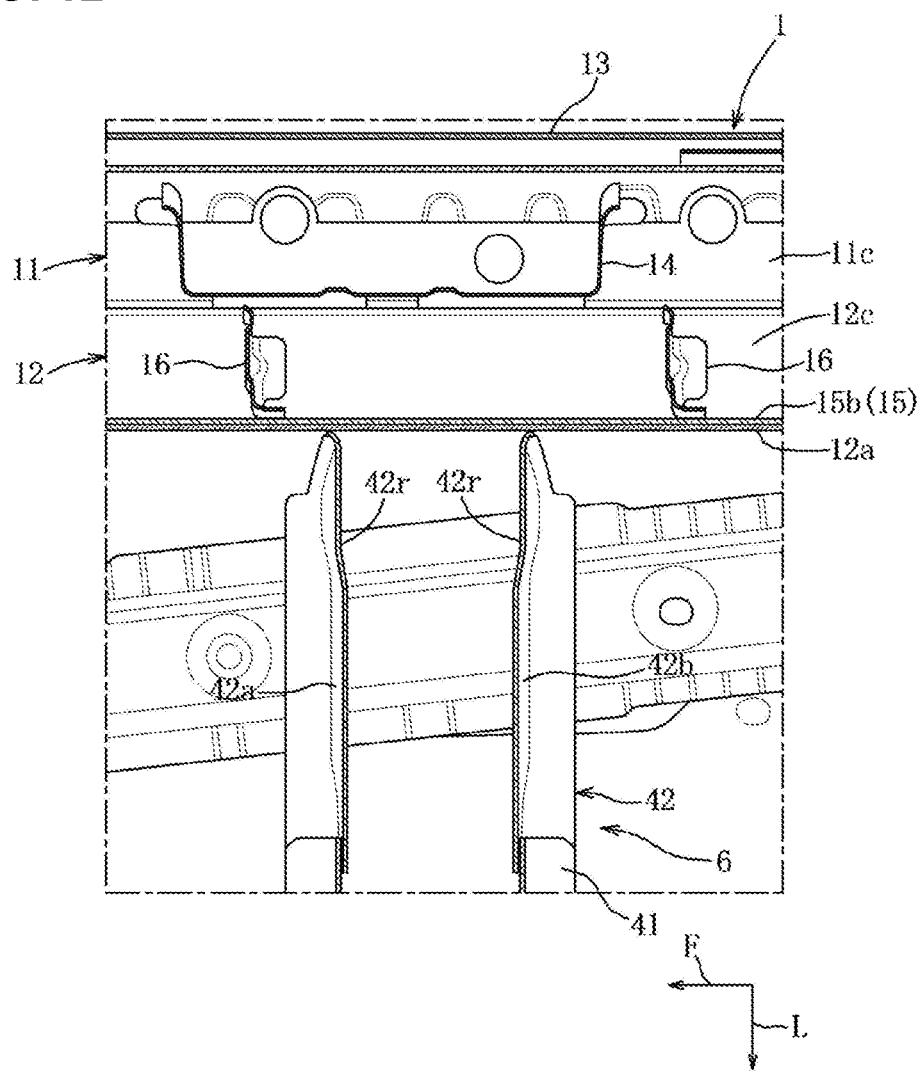
FIG. 12 is a sectional view taken along line XII-XII of FIG. 8.
Figure 13:
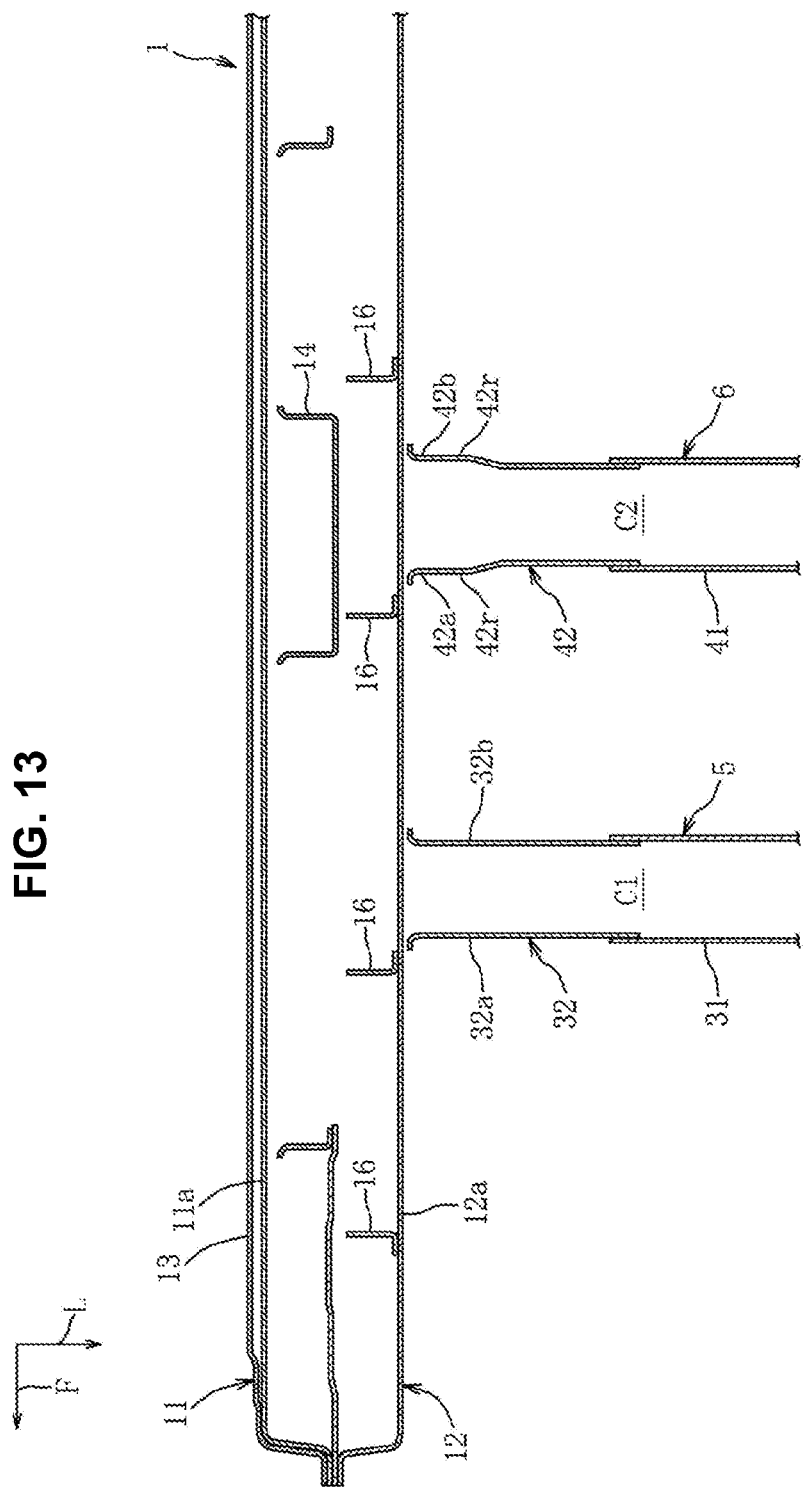
FIG. 13 is a sectional view taken along line XIII-XIII of FIG. 7.

As shown in FIGS. 5, 10 and 11, the upper wall portion 32c is joined such that an upper face of a left-side (inward-side, in the vehicle width direction) end portion thereof is welded to a lower face of a right-side end portion of the upper wall portion of the first middle portion 31 and a lower face of a right-side (outward-side, in the vehicle width direction) end portion thereof is welded to an upper face of the upper wall portion 12b of the inner panel 12. The upper wall portion 32c is provided with bead portions 32s, 32t which are respectively configured to be recessed (concaved) downwardly and extend in the longitudinal direction and an opening portion 32u which is configured to penetrate the upper wall portion 32c vertically. The bead portion 32s is formed on the right side (the outward side, in the vehicle width direction) of the floor frame 3, and the bead portion 32t is formed on the right side of the bead portion 32s. The opening portion 32u is of a nearly oval shape and configured to overlap the bead portion 32t in the vehicle width direction.

Next, the second cross member 6 will be described. As shown in FIGS. 1, 2, 6, 8 through 10, 12 and 13, the second cross member 6 interconnects respective middle parts of the pair of side sills 1 in back of the first cross member 5 and forms a rectangular-shaped second closed-cross section C2 extending laterally together with the upper surface of the floor panel 2. Herein, the second closed-cross section C2 is set to have a smaller sectional area than the first closed-cross section C1. In other words, a secondary cross-sectional moment of the second cross member 6 is set to be smaller than that of the first cross member 5.

The second cross member 6 comprises a second middle portion 41 and a pair of right-and-left second side portions 42 which extend outwardly, in the vehicle width direction, from right-and-left both end portions of the second middle portion 41. The second middle portion 41 is made of a ultrahigh tensile strength steel plate having the plate thickness of 2.3 mm, for example, and configured to have a nearly hat-shaped cross section. A flange portion formed at a lower end portion of the second middle portion 41 is joined to the upper surface of the floor panel 2 by welding.

The pair of second side portions 42 are respectively made of a steel plate having lower toughness and rigidity than the second middle portion 41, such as a cold rolled steel plate having the plate thickness of 2.3 mm, for example, and configured to have a nearly hat-shaped cross section. The right-side second side portion 42 comprises a front wall portion 42a which is provided to be perpendicular to the longitudinal direction, a rear wall portion 42b which faces the front wall portion 42b with a specified distance therebetween, an upper wall portion 42c which connect respective upper end portions of the front wall portion 42a and the rear wall portion 42b, and so on. Further, the second side portion 42 is provided with a step portion 42q where the level (height position) of a right-side portion thereof is higher than that of a left-side portion thereof. The step portion 42q is a portion which extends between the inner panel 12 and the floor frame 3. The present embodiment is configured such that the distance between the inward-side wall portion 12a of the inner panel 12 and the step portion 42q is nearly equal to the distance between the inward-side wall portion 12a of the inner panel 12 and the bead portion 32s.

A linear-shaped ridgeline portion 42r which protrudes in an opposite direction to the second closed-cross section C2 is formed at each of the front wall portion 42a and the rear wall portion 42b. As shown in FIGS. 8 through 10, 12 and 13, the ridgeline portion 42r is configured such that its upper end portion is located at a position corresponding to the step portion 42q and it extends obliquely downwardly-and-outwardly. Flange portions formed at respective lower end portions of the front wall portion 42a and the rear wall portion 42b are joined to the upper surface of the floor panel 2 by welding, and a flange portion formed at the right side (the outward side, in the vehicle width direction) thereof is joined to the inward-side wall portion 12a.

As shown in FIGS. 6 and 8 through 10, the upper wall portion 42c is joined such that an upper face of a left-side (inward-side, in the vehicle width direction) end portion thereof is welded to a lower face of a right-side end portion of the upper wall portion of the second middle portion 41 and a lower face of a right-side (outward-side, in the vehicle width direction) end portion thereof is welded to an upper face of the upper wall portion 12b of the inner panel 12. The upper wall portion 42c is provided with a bead portion 42s which is configured to be recessed (concaved) downwardly and extend longitudinally. The bead portion 42s is formed at a position located on the left side (the inward side, in the vehicle width direction) of the step portion 42q and between the right-and-left vertical wall portion of the floor frame 3.

Thereby, a foot space of a passenger seated in the rear seat is secured and deterioration of the energy absorption performance in a case of the vehicle side collision is suppressed. Further, deterioration of the energy absorption performance in the case of the vehicle side collision, which may be caused by the sectional area of the second cross member 6 being smaller than the sectional area of the first cross member 5, is suppressed by collapsing of the floor frame 3 in addition to collapsing of the first and second side portions 32, 43.

Figure 9:
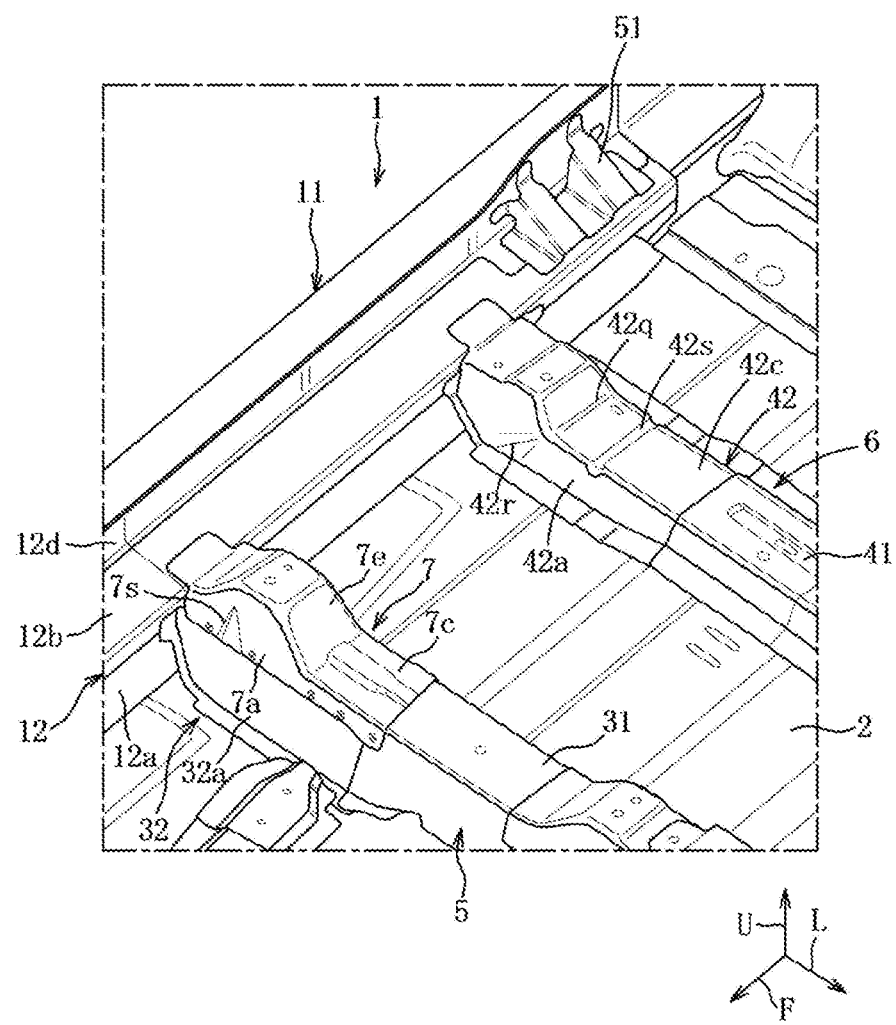
FIG. 9 is an enlarged view of a major part of FIG. 1.

As shown in FIGS. 9 and 10, a stopper bracket 51 is provided to connect the upper wall portion 12b and the upper flange portion 12d of the inner panel 12 beside the second cross member 6. Herein, each of the pair of floor frames 3 extends obliquely such that its rearward side is located on the right side (on the outward side, in the vehicle width direction) of its forward side, a position of an inward end of the first side portion 32 of the first cross member 5 is located at the same position, in the vehicle width direction, as the floor frame 3, and a position of an inward end of the second side portion 42 of the second cross member 6 is located on the leftward side (on the inward side, in the vehicle width direction) of the floor frame 3. Accordingly, a side door (not illustrated) can be properly suppressed from coming into the cabin in the vehicle side collision by the stopper bracket 51 and also deterioration of the energy absorption performance of the side sill 1 which may be caused by providing the stopper bracket 51 can be properly suppressed by both collapsing of the first and second side portions 32, 42 and the floor frame 3.

Next, the pair of seat brackets 7 will be described. These are provided as the seat bracket 7 to support an front portion of an outward side, in the vehicle width direction, of a driver's seat seating a driver and the seat bracket 7 to support an front portion of an outward side, in the vehicle width direction, of a driver's assistant seat seating a passenger. Herein, a seat bracket to support a front portion of each inward side, in the vehicle width direction, of the driver's seat and the driver's assistant seat is provided around a middle portion, in the lateral direction, of the first cross member 5.

As shown in FIGS. 1, 2, 5, 7, 9 and 11, the right-side seat bracket 7 is provided to cover an upper half part of the right-side first side portion 32. The seat bracket 7 is made of the cold rolled steel plate having the plate thickness of 2.3 mm, for example, and configured to have a nearly U-shaped cross section. The seat bracket 7 comprises a front wall portion 7a which is provided to be perpendicular to the longitudinal direction, a rear wall portion 7b which faces the front wall portion 7a with a specified distance therebetween, an upper wall portion 7c which connects respective upper end portions of the front wall portion 7a and the rear wall portion 7b, and so on.

Further, the seat bracket 7 is provided with a protrusion portion 7e which is upwardly spaced apart from the upper wall portion 32c of the first cross member 5 (the first side portion 32). The protrusion portion 7e is a portion which extends between the inner panel 12 and the floor frame 3 and configured to be of a trapezoidal shape in an elevational view. Herein, the upper wall portion of the first middle portion 31 and the upper wall portion 32c of the pair of first side portions 32 correspond to the upper face portion of the first cross member 5, and a part of the upper wall portion 32c of the first side portions 32 which is covered with the protrusion portion 7e of the seat bracket 7 corresponds to a part of the upper face portion of the first cross member 5 in the claims.

Figure 7:
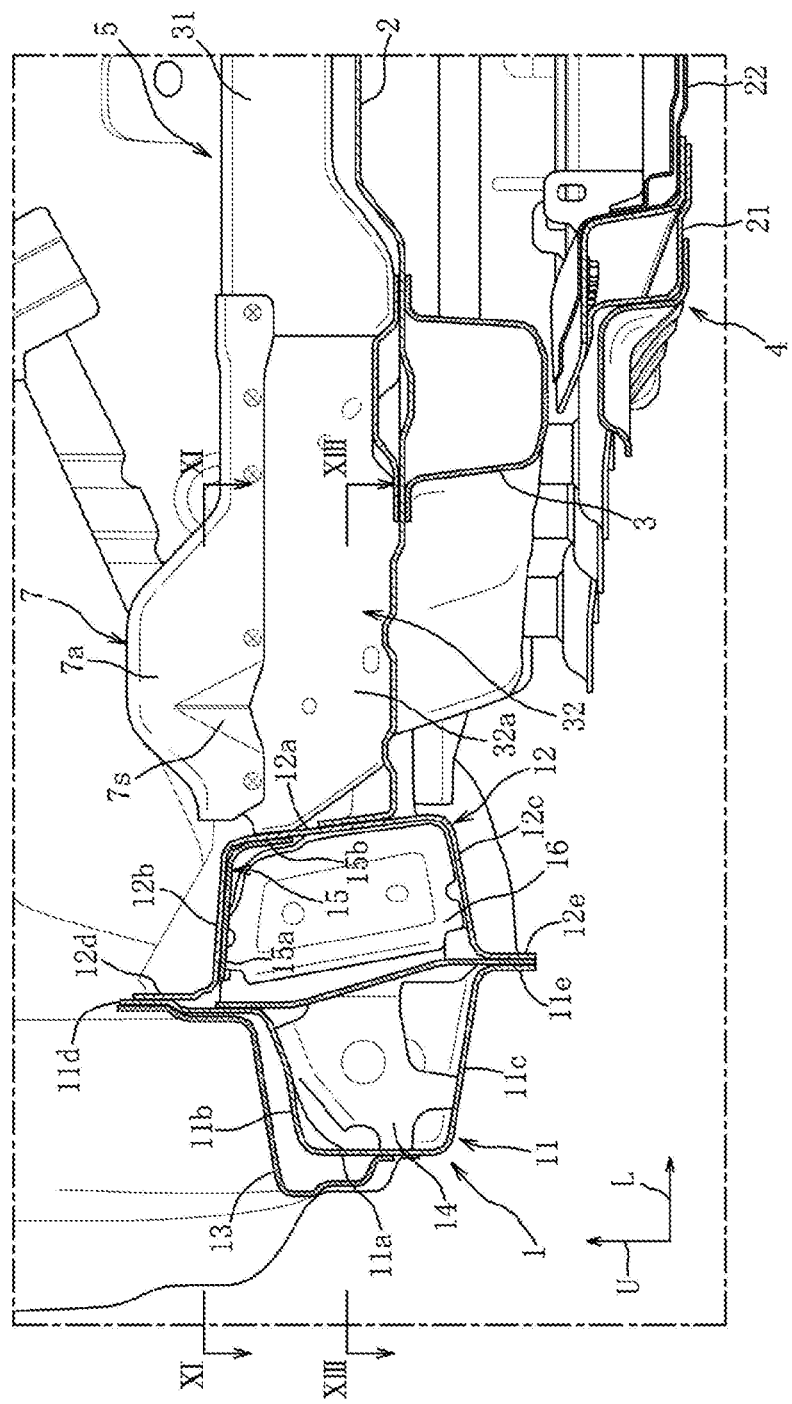
FIG. 7 is a sectional view taken along line VII-VII of FIG. 2.
Figure 8:
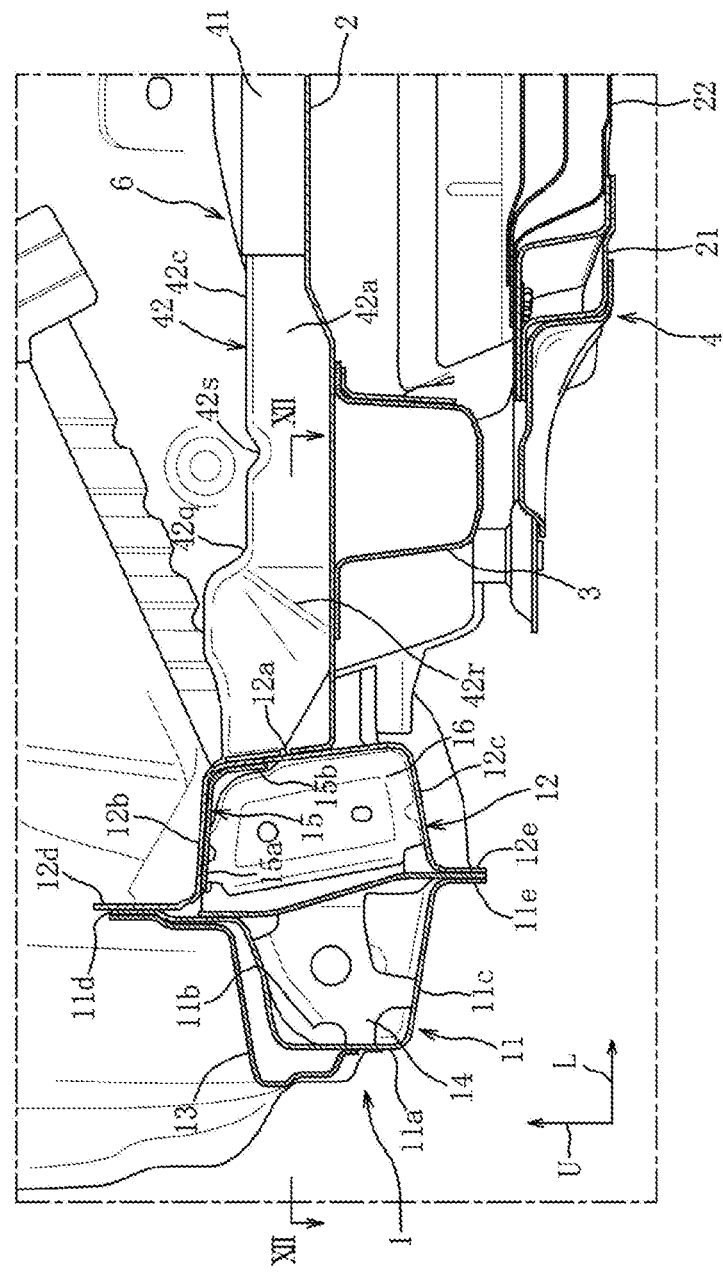
FIG. 8 is a sectional view taken along line VIII-VIII of FIG. 2.

A bead portion 7s which protrudes in an opposite direction to the protrusion portion 7e and extends vertically is formed at each of the front wall portion 7a and the rear wall portion 7b. As shown in FIGS. 7, 9 and 11, the bead portion 7s is arranged on the right side of the bead portion 32t and configured such that its lateral width becomes larger as it goes downwardly from the upper end portion of the front wall portion 7a. Flange portions formed at lower end portions of the front wall portion 7a and the rear wall portion 7b are welded to the front wall portion 32a and the rear wall portion 32b of the first cross member 5 (the first side portion 32), respectively, such that the bead portion 7s is laterally interposed therebetween.

As shown in FIGS. 5, 7 and 9, the upper wall portion 7c is configured such that its left-side end portion extends to the inner panel 12 (the inward-side wall portion 12a) and a lower face of its right-side end portion is joined to an upper face of a right-side end portion of the upper wall portion of the first middle portion 31 by welding. The right-side end portion of the upper wall portion of the first middle portion 31 is interposed between the upper wall portion 32c of the first side wall 32 and the upper wall portion 7c, and these three members are joined by welding.

Hereafter, the mechanism of the energy absorption in the case of the side collision of the vehicle V will be described. At an initial stage of the vehicle side collision, a collision load is inputted to a part, in a longitudinal direction, of the side sill 1. Since the reinforcements 14-16 are provided inside the side sill 1, sectional collapsing of the side sill 1 is suppressed. In particular, since the first inner reinforcement 15 is formed over a whole length of the side sill 1, even if the input load is inputted to a specified point of the outer panel 11, the input load is dispersed to a whole part of the first inner reinforcement 15 through a load path which is composed of the plural framework members, such as the first and second cross members 5, 6.

At a middle stage of the vehicle side collision, there occur deformations of the side sill 1 and the first and second cross members 5, 6. The input load causes inwardly-generated collapse deformation of the side sill 1 as well as upwardly-rotational move of the side sill 1 around its joint portion to the floor panel 2. Almost at the same time, the input load causes bending deformation of the front wall portion 7a and the rear wall portion 7b with its deformation starting point located at the bead portion 7s of the seat bracket 7, and then causes collapse deformation of the first side portion 32 with its deformation starting point located at the bead portions 32s, 32t and the opening portion 32u which are formed at the upper wall portion 32c. Since the first side portion 32 is configured to have lower toughness than the first middle portion 31, the sufficient collapse deformation is achieved even if the seat bracket 7 is provided.

At the second cross member 6, the input load causes bending deformation of the front wall portion 42a and the rear wall portion 42b with its deformation starting point located at the ridgeline portion 42r and collapse deformation of the second side portion 42 with its deformation starting point located at the bead portion 42s. While a portion of the second cross member 6 which is positioned between the side sill 1 and the floor frame 3 is smaller (shorter) than a portion of the first cross member 5 which is positioned between the side sill 1 and the floor frame 3, the sectional area of the second closed-cross section C2 of the second cross member 6 is set to be smaller than that of the first closed-cross section C1 of the first cross member 5, so that respective collapse-deformation tendencies of the collapse deformation of the first and second cross members 5, 6 relative to the floor frame 3 are matched.

At a later stage of the vehicle side collision, the remaining collision load which has not be absorbed by the collapse deformation of the first side portion 32 and others causes inwardly-generated deformation of the floor frame 3. A part of the load inputted at the initial stage is absorbed by the collapse deformation of the first and second side portions 32, 42 and the bending deformation of the seat bracket 7, and also another part of the input load is dispersed to the other framework members (e.g., the opposite-side side sill 1, hinge pillar 8, rear pillar 9, and so on) through the first and second cross members 5, 6, so that the deformation of the floor frame 3 is suppressed. Thereby, the damage of the battery unit 4 can be minimized.

Next, the operations and effects of the above-described lower vehicle-body structure will be described. According to the lower vehicle-body structure of the present embodiment, since the seat bracket 7 comprises the protrusion portion 7e which partially covers the upper wall portion 32c of the first side portion 32 (the first cross member 5) and is upwardly spaced apart from the upper wall portion 32c of the first cross member 5, the first cross member 5 is provided with the part of the upper face portion thereof (i.e., the part of the upper wall portion 32c of the first side portion 32) which is spaced apart from the seat bracket 7 and also the seat bracket 7 can be disposed at the first cross member 5. Since the low-rigidity portion is formed at the part of the upper face portion of the first cross member 5 (i.e., the part of the upper wall portion 32c of the first side portion 32) which is located at the position corresponding to the protrusion portion 7e of the seat bracket 7 and this low-rigidity portion is configured to make rigidity of the part of the upper face portion of the first cross member 5 (i.e., the part of the upper wall portion 32c of the first side portion 32) where the low-rigidity portion is formed be lower than that of the other part of the upper face portion of the cross member 5 where the low-rigidity portion is not formed, the above-described part of the upper face portion of the first cross member 5 (i.e., the part of the upper wall portion 32c of the first side portion 32) can be properly collapsed and deformed inwardly, in the vehicle width direction, by the load inputted in the vehicle side collision, without improperly decreasing the rigidity of the front wall portion 32a and the rear wall portion 32b of the first cross member 5 which contribute to the support rigidity of the seat bracket 7.

Since the low-rigidity portion is the bead portions 32s, 32t which are configured to extend in the vehicle longitudinal direction at the above-described part of the upper face portion of the first cross member 5 (i.e., the part of the upper wall portion 32c of the first side portion 32), the above-described part of the upper face portion of the first cross member 5 (i.e., the part of the upper wall portion 32c of the first side portion 32) can be properly collapsed and deformed inwardly, in the vehicle width direction, with a simple structure.

Since the low-rigidity portion is the opening portion 32u which is formed at the part of the upper face portion of the first cross member 5 (i.e., the part of the upper wall portion 32c of the first side portion 32), the above-described part of the upper face portion of the first cross member 5 (i.e., the part of the upper wall portion 32c of the first side portion 32) can be properly collapsed and deformed inwardly, in the vehicle width direction, achieving weight reduction.

Since the low-rigidity portion is composed by the opening portion 32u and the bead portion 32t which are formed at the part of the upper face portion of the first cross member 5 (i.e., the part of the upper wall portion 32c of the first side portion 32) such that the bead portion 32t extends in the vehicle longitudinal direction, overlapping the opening portion 32u in the vehicle width direction, the energy absorption (EA) performance in the case of the vehicle side collision can be further improved.

The seat bracket 7 further comprises the front wall portion 7a, the rear wall portion 7b which faces the front wall portion 7a, and the upper wall portion 7c which connects the respective upper ends of the front wall portion 7a and the rear wall portion 7b, and the bead portion 7s which extends in the vertical direction is formed at each of the front wall portion 7a and the rear wall portion 7b. According to this structure, the seat bracket 7 can be bent and deformed inwardly in the vehicle width direction, without reducing the rigidity, in the vertical direction, of the front wall portion 7a and the rear wall portion 7b of the seat bracket 7, and the first cross member 1 can be allowed to have inwardly-generated collapse deformation which is caused by the load inputted in the vehicle side collision.

Since the opening portion 32u is formed at a portion of the upper face portion of the first cross member 5 which is enclosed by the bead portions 7s formed at the front wall portion 7a and the rear wall portion 7b, the bending deformation of the seat bracket 7 which is caused by the bead portions 7s and the collapse deformation of the first cross member 5 which is caused by the opening portion 32u can be synchronized, so that the collapse deformation of the first cross member 1 can be promoted.

Since each of the front wall portion 7a and the rear wall portion 7b of the seat bracket 7 is joined to the first cross member 1 at portions which interpose the bead portion 7s between the portions, the seat bracket 7 can be joined to the first cross member 1, without hindering the bending deformation of the seat bracket 7.

The lower vehicle-body structure further comprises the second cross member 6 interconnecting the pair of side sills 1 at the foot space of the passenger seated in the rear seat which is positioned on the rearward side, in the vehicle longitudinal direction, of the first cross member 5, the first cross member 5 forms the first closed-cross section C1 extending in the vehicle width direction together with the floor panel 3, the second cross member 6 forms the second closed-cross section C2 extending in the vehicle width direction together with the floor panel 3, the second closed-cross section C2 is set to have a lower sectional height and the smaller sectional area than the first closed-cross section C1, and the position of the inward end of the second side portion 42 of the second cross member 6 is located on the inward side, in the vehicle width direction, of the position of the inward end of the first side portion 32 of the first cross member 5. Accordingly, the foot space of the passenger seated in the rear seat can be secured properly by lowering the sectional height of the second cross member 6 and also deterioration of the energy absorption performance in the case of the vehicle side collision can be suppressed by decreasing the sectional area of the second cross member 6 and thereby positioning the inward end of the second side portion 42 at the inward side in the vehicle width direction.

Since each of the pair of floor frames 3 extends obliquely such that its rearward side is located on the outward side, in the vehicle width direction, of its forward side, the position of the inward end of the first side portion 32 of the first cross member 5 is located at the same position, in the vehicle width direction, as the floor frame 3, and the position of the inward end of the second side portion 42 of the second cross member 6 is located on the inward side, in the vehicle width direction, of the floor frame 3, the deterioration of the energy absorption performance in the case of the vehicle side collision which may be caused by setting the second cross member 6 to have the smaller sectional area than the first cross member 5 can be properly suppressed by collapsing of the floor frame 3 in addition to collapsing of the first and second side portions 32, 42.

Since the first reinforcing member 15 extending substantially horizontally is provided inside each of the pair of side sills 1, the rigidity, in the vehicle width direction, of the side sill 1 can be effectively increased by the reinforcing member 15. Further, since the reinforcing member 15 is provided to extend at least from the first cross member 5 to the second cross member 6, the load path reaching the first and second cross members 5, 6 can be created via the reinforcing member 15 regardless of the input position of the collision load in the vehicle side collision, so that the load applied in the vehicle side collision can be dispersed by utilizing the framework structure of the vehicle body.

Each of the first and second cross members 5, 6 is configured such that its outward-side portion which is positioned on the outward side, in the vehicle width direction, of the floor frame 3 has the lower rigidity than its inward-side portion which is positioned on the inward side, in the vehicle width direction, of the floor frame 3. Accordingly, the respective outward-side portions of the first and second cross members 5, 6 which are positioned on the outward side, in the vehicle width direction, of the floor frame 3 can be made to have the inwardly-generated collapse deformation, so that the energy absorption performance in the case of the vehicle side collision can be improved.

Since each of the pair of side sills 1 comprises the side sill outer 11 which forms the outward-side portion, in the vehicle width direction, thereof and the side sill inner 12 which forms the inward-side portion, in the vehicle width direction, thereof, and the first reinforcing member 15 is provided to extend from the inward end, in the vehicle width direction, of the side sill inner 12 to the outward end, in the vehicle width direction, of the side sill inner 12, the load applied in the vehicle side collision can be dispersed, preventing buckling of the side sill 1.

Since the side sill inner 12 comprises the upper wall portion 12b, the lower wall portion 12c which faces the upper wall portion 12b, and the inward-side wall portion 12a which connects the respective inward-side ends, in the vehicle width direction, of the upper wall portion 12b and the lower wall portion 12c, and the first reinforcing member 15 is provided to extend from the upper wall portion 12b to the inward-side wall portion 12a, the load applied in the vehicle side collision can be dispersed, preventing sectional collapsing of the side sill 1.

Since the first reinforcing member 15 is provided to extend from the front end of the side sill inner 12 to the rear end of the side sill inner 12, the load path reaching the first and second cross members 5, 6 can be created even when the input position of the collision load is far away from the first and second cross members 5, 6.

The lower vehicle-body structure further comprises the stopper bracket 51 which is provided to connect the upper wall portion 12b of side sill inner 12 and the upper flange portion 12d of the side sill inner 12 so as to suppress the side door of the vehicle from coming into the cabin in the vehicle side collision, wherein each of the pair of floor frames 3 extends obliquely such that its rearward side is located on the outward side, in the vehicle width direction, of its forward side, the position of the inward end of the first side portion 32 of the first cross member 5 is located at the same position, in the vehicle width direction, as the floor frame 3, and the position of the inward end of the second side portion 42 of the second cross member 6 is located on the inward side, in the vehicle width direction, of the floor frame 3. Accordingly, the side door can be properly suppressed from coming into the cabin in the vehicle side collision by the stopper bracket 51 and also deterioration of the energy absorption performance of the side sill 1 which may be caused by providing the stopper bracket 51 can be properly suppressed by both collapsing of the first and second side portions 32, 42 and the floor frame 3.

Lastly, partially-modified examples of the above-described embodiment will be described.

1] While the above-described embodiment exemplified the hybrid automotive vehicle provided with the internal combustion engine and the electric motor, the present invention is applicable to an electric automotive vehicle provided with the electric motor only as long as the vehicle is equipped with the battery unit. Further, the door structure of the hinged double doors type which has no center pillar may not be indispensable, but the present invention is applicable to a two-door type vehicle which has no rear door.

2] While the above-described embodiment exemplified the case where the seat bracket is provided at the first cross member only, the seat bracket may be provided with the second cross member. In this case, the low-rigidity portion can be provided at the second cross member based on the desired energy absorption performance.

3] While the above-described embodiment exemplified the case where the two bead portions and the single opening portion as the low-rigidity portion are provided at the first cross member, the bead portions may be provided only without providing the opening portion or the opening portion may be provided only without providing the bead portion. Also, the number of the bead portion or the opening portion can be set properly according to the design. Moreover, the low rigidity portion which has a materially low rigidity may be applied instead of the low rigidity portion which has the structural low rigidity, such as the above-described bead portion. For example, the part of the cross member to have the low rigidity may be made of a kind of the steel plate having the relatively-low toughness, compared to the steel plate which makes the other part of the cross member, or the part of the cross member to have the low rigidity may be made of the steel plate having the relatively-thin plate thickness, compared to the same kind of steel plate which makes the other part of the cross member.

4] While the above-described embodiment exemplified the nearly L-shaped first inner reinforcement which is joined to the upper wall portion and the inward-side wall portion of the inner panel, a nearly U-shaped first inner reinforcement which is joined to the upper wall portion, the lower wall portion and the inward-side wall portion is useable instead as long as the upward-side reinforcement portion is provided at least.

5] While the above-described embodiment exemplified the case where the four second inner reinforcements are provided, the number of the second inner reinforcements provided may be set at three or less, or five or more.

6] The present invention should not be limited to the above-described embodiment or modified examples and any other modifications or improvements may be applied within the scope of a spirit of the present invention.

What is claimed is:

1. A lower vehicle-body structure of a vehicle, comprising:
    a pair of right-and-left side sills extending in a vehicle longitudinal direction;
    a floor panel provided to extend between the pair of side sills;
    a pair of right-and-left floor frames extending in the vehicle longitudinal direction between the pair of side sills on a downward side of the floor panel;
    a battery unit provided between the pair of floor frames;
    a first cross member interconnecting the pair of side sills on an upward side of the floor panel; and
    a seat bracket supporting a seat capable of seating a passenger and provided at an outward end portion, in a vehicle width direction, of the first cross member,
    wherein said seat bracket comprises a protrusion portion which partially covers an upper face portion of said first cross member and is upwardly spaced apart from the upper face portion of the first cross member, and a low-rigidity portion is formed at a part of the upper face portion of the first cross member which is located at a position corresponding to said protrusion portion of the seat bracket, the low-rigidity portion being configured to make rigidity of said part of the upper face portion of the first cross member where the low-rigidity portion is formed be lower than that of the other part of the upper face of the cross member where the low-rigidity portion is not formed.

2. The lower vehicle-body structure of the vehicle of claim 1, wherein said low-rigidity portion is one or plural bead portions which are configured to extend in the vehicle longitudinal direction at said part of the upper face portion of the first cross member.

3. The lower vehicle-body structure of the vehicle of claim 1, wherein said low-rigidity portion is an opening portion which is formed at said part of the upper face portion of the first cross member.

4. The lower vehicle-body structure of the vehicle of claim 1, wherein said low-rigidity portion is composed by an opening portion and a bead portion which are formed at said part of the upper face portion of the first cross member such that the bead portion extends in the vehicle longitudinal direction, overlapping the opening portion in the vehicle width direction.

5. The lower vehicle-body structure of the vehicle of claim 1, wherein said seat bracket further comprises a front wall portion, a rear wall portion which faces the front wall portion, and an upper wall portion which connects respective upper ends of the front wall portion and the rear wall portion, and a bead portion which extends in a vertical direction is respectively formed at said front wall portion and said rear wall portion.

6. The lower vehicle-body structure of the vehicle of claim 5, wherein an opening portion is formed at a portion of the upper face portion of said first cross member which is enclosed by said bead portions formed at the front wall portion and the rear wall portion.

7. The lower vehicle-body structure of the vehicle of claim 5, wherein each of said front wall portion and said rear wall portion of the seat bracket is joined to said first cross member at portions thereof which interpose said bead portion between the portions.

8. The lower vehicle-body structure of the vehicle of claim 1, further comprising a second cross member interconnecting said pair of side sills at a foot space of a passenger seated in a rear seat which is positioned on a rearward side, in the vehicle longitudinal direction, of said first cross member, wherein said first cross member forms a first closed-cross section extending in a vehicle width direction together with said floor panel, said second cross member forms a second closed-cross section extending in the vehicle width direction together with said floor panel, said second closed-cross section is set to have a lower sectional height and a smaller sectional area than said first closed-cross section, and a position of an inward end of a low-rigidity portion which is formed at said second cross member is located on an inward side, in the vehicle width direction, of a position of an inward end of a low-rigidity portion which is formed at the first cross member.

9. The lower vehicle-body structure of the vehicle of claim 8, wherein each of said pair of floor frames extends obliquely such that a rearward side thereof is located on an outward side, in the vehicle width direction, of a forward side thereof, said position of the inward end of the low-rigidity portion formed at the first cross member is located at the same position, in the vehicle width direction, as the floor frame, and said position of the inward end of the low-rigidity portion formed at the second cross member is located on the inward side, in the vehicle width direction, of the floor frame.

10. The lower vehicle-body structure of the vehicle of claim 1, further comprising a second cross member interconnecting said pair of side sills at a position which is located on an upward side of said battery unit via said floor panel and on a rearward side of said first cross member, wherein a reinforcing member which extends substantially horizontally is provided inside each of said pair of side sills, and said reinforcing member is provided to extend at least from said first cross member to said second cross member.

11. The lower vehicle-body structure of the vehicle of claim 10, wherein each of said first and second cross members is configured such that an outward-side portion thereof which is positioned on an outward side, in the vehicle width direction, of said floor frame has lower rigidity than an inward-side portion thereof which is positioned on an inward side, in the vehicle width direction, of said floor frame.

12. The lower vehicle-body structure of the vehicle of claim 10, wherein each of said pair of side sills comprises a side sill outer which forms an outward-side portion, in the vehicle width direction, thereof and a side sill inner which forms an inward-side portion, in the vehicle width direction, thereof, and said reinforcing member is provided to extend from an inward end, in the vehicle width direction, of said side sill inner to an outward end, in the vehicle width direction, of the side sill inner.

13. The lower vehicle-body structure of the vehicle of claim 10, wherein said side sill inner comprises an upper wall portion, a lower wall portion which faces the upper wall portion, and an inward-side wall portion which connects respective inward-side ends, in the vehicle width direction, of the upper wall portion and the lower wall portion, and said reinforcing member is provided to extend from said upper wall portion to said inward-side wall portion.

14. The lower vehicle-body structure of the vehicle of claim 10, wherein said reinforcing member is provided to extend from a front end of said side sill inner to a rear end of said side sill inner.

15. The lower vehicle-body structure of the vehicle of claim 11, further comprising a stopper bracket which is provided to connect an upper wall portion of side sill inner and a flange portion of said side sill inner so as to suppress a side door of the vehicle from coming into a cabin in a vehicle side collision, wherein each of said pair of floor frames extends obliquely such that a rearward side thereof is located on the outward side, in the vehicle width direction, of a forward side thereof, a position of an inward end of a low-rigidity portion which is formed at said first cross member is located at the same position, in the vehicle width direction, as the floor frame, and a position of an inward end of a low-rigidity portion which is formed at said second cross member is located on the inward side, in the vehicle width direction, of the floor frame.

* * * * *